April 3, 1945. G. T. REICH 2,372,854
YEAST
Filed April 15, 1941
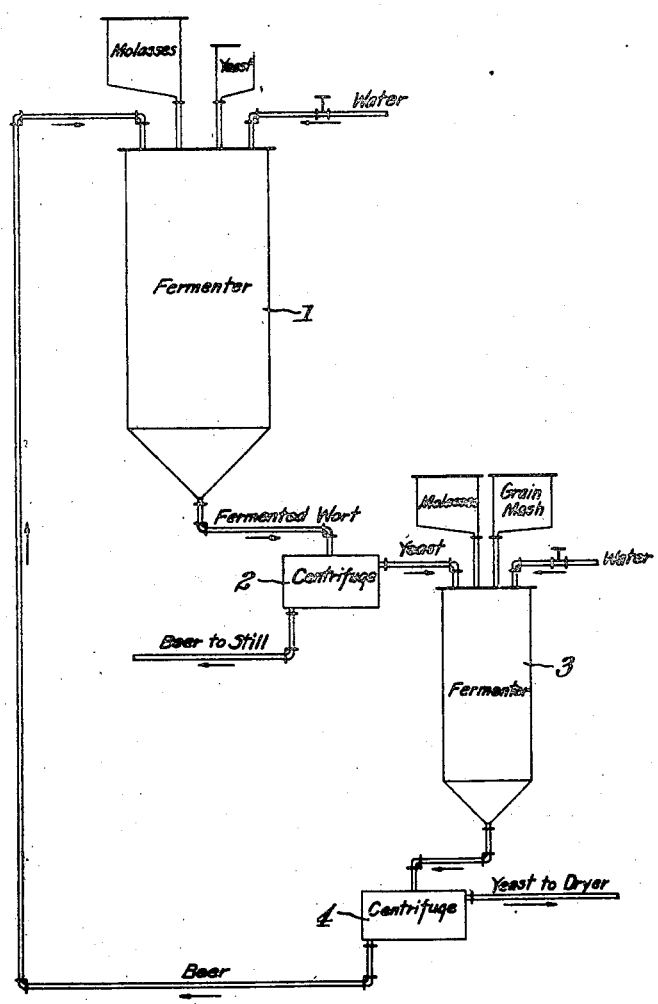
Inventor:
Gustave T. Reich
By Pierce & Schaffler
Attorneys.

Patented Apr. 3, 1945

2,372,854

UNITED STATES PATENT OFFICE 2,372,854

YEAST

Gustave T. Reich, Philadelphia, Pa.

Application April 15, 1941, Serial No. 388,696

12 Claims. (Cl. 99—96)

This invention relates to yeast and its production and it is particularly directed to a method of improving the quality of yeast obtained in the alcoholic fermentation of saccharine materials, particularly sugar refinery materials such as black-strap molasses.

Yeast produced in the alcoholic fermentation of molasses is usually dark-colored and has a strong flavor which substantially restricts the use of such yeast for food purposes in spite of its considerable content of vitamins, particularly vitamins $B_1$ and G. It is known that a yeast of light color may be produced with aerobic fermentation but the vitamin $B_1$ and G content of such yeast is lower than that produced under anaerobic conditions. When yeast is produced in very dilute mashes the product has the bright color which characterizes bakers' yeast, but it is uneconomical to carry out alcoholic fermentation in dilute mashes and the profitable production of alcohol from sugar refinery materials and the like requires highly concentrated mashes, of up to 20° Brix or more.

I have found, however, that the yeast obtained in the usual alcoholic fermentation of saccharine material may be very greatly improved in color and flavor and its content of vitamins $B_1$ and G very substantially increased while at the same time increasing the quantity of the yeast, by subjecting the yeast from the alcoholic fermentation to a subsequent refermentation in the presence of grain mash, grain extract, steep water or similar grain substance under relatively dilute conditions. The refermentation may be either aerobic or anaerobic or a combination of both.

This method of treating the yeast produces a much greater effect on the color and other properties of the yeast than any mechanical or chemical treatment since by causing the yeast product to grow in a dilute alcoholic fermentation mash containing grain mash or grain extract, not only the new growth but also the original yeast takes on the qualities of a grain mash yeast due to the active osmosis of the living cells.

Preferably, the dilute beer produced in the refermentation is returned to the main alcoholic fermentation, replacing the make-up water. In this manner, its alcohol content is saved without the expense of stripping it, and its vitamin and yeast food content are returned to the main mash.

For the purpose of illustrating the principles of the invention, a particular embodiment of the invention will be described with reference to the accompanying drawing showing a diagrammatic flow sheet of the described embodiment.

The principal fermentation is carried out in fermenter 1. For example, to a mixture of 20,000 gallons of black-strap molasses and 75,000 gallons of water in the fermenter there is added 5,000 gallons of yeast mash and the wort subjected to anaerobic fermentation in accordance with usual practice in the manufacture of alcohol to produce a fermented wort containing 6 to 10% of alcohol. After the completion of the fermentation, the yeast is separated from the beer in centrifuge 2 and the beer is sent to suitable recovery stills (not shown).

The yeast, which may amount to about 7,000 pounds of wet yeast, equivalent to about 2,000 pounds of dry yeast, is placed in fermenter 3, together with 530 gallons of molasses, 20,000 to 27,000 gallons of water, and a grain mash from about 40 bushels of grain with the usual proportion of malt, which is preferably very finely ground in a suitable colloid mill to say 1 to 3 microns or is made into a grain extract. The reactivating or refermentation mash thus produced at a density of 3–8° Brix makes possible a rapid fermentation and produces a yeast of uniform particle size. The refermentation operation produces a fermented wort containing from 1 to 3% of alcohol. The yeast is separated from the dilute beer in centrifuge 4. The beer is returned to fermenter 1 to replace part of the make-up water. The yeast obtained, equivalent to about 4,000 pounds of dry yeast, is sent to a filter press or dryer (not shown).

The yeast produced in the refermentation operation is not only much greater in amount, but its color is much lighter than that of the yeast from the main fermentation. Its vitamin content is increased, for example, from 5–10 International units of $B_1$ and 20 micrograms per gram of G to 15 units of $B_1$ and 35 micrograms per gram of G or more, together with increased amounts of the other vitamins of the B complex. The taste is characteristic of that of grain yeast, and, in general, in both appearance and quality the yeast is much more suitable for use as a food product than the original yeast. If desired, a small amount of hops extract may be added to the grain mash or preferably to the centrifuged yeast before drying, thereby imparting a flavor similar to that of brewers' yeast without the production of beverage beer.

I claim:

1. A method of improving the color and vitamin content of yeast from the alcoholic fermentation of saccharine materials which comprises subjecting the yeast, after it has been separated from the liquid products of the fermentation, to refermentation in the presence of a substantial amount of grain substance.

2. A method of improving the color and vitamin content of yeast from the alcoholic fermentation of saccharine materials which comprises subjecting the yeast, after it has been separated from the liquid products of the fermentation, to refermentation in the presence of finely divided grain mash.

3. A method of improving the color and vitamin content of yeast from the alcoholic fermentation of saccharine materials which comprises refermenting the yeast, after it has been separated from the liquid products of the fermentation, in a dilute saccharine wort in the presence of a substantial amount of grain substance.

4. A method of improving the color and vitamin content of yeast from the alcoholic fermentation of saccharine materials which comprises refermenting the yeast, after it has been separated from the liquid products of the fermentation, in a dilute saccharine wort in the presence of a substantial amount of grain substance, separating the yeast from the fermented wort and using the beer to replace make-up water in the primary alcoholic fermentation.

5. A method of improving the color and vitamin content of yeast from the alcoholic fermentation of saccharine materials which comprises refermenting the yeast, after it has been separated from the liquid products of the fermentation, in a dilute saccharine wort of a density of about 3 to 8° Brix in the presence of a substantial amount of grain substance.

6. A method of producing yeast and alcohol which comprises subjecting a saccharine material to alcoholic fermentation with yeast, separating the yeast from the resulting beer, subjecting the yeast to refermentation in the presence of a substantial amount of grain substance, separating the yeast from the resulting beer and returning the beer to the primary fermentation.

7. A method of producing yeast and alcohol which comprises subjecting a saccharine material to alcoholic fermentation with yeast, separating the yeast from the resulting beer, subjecting the yeast to refermentation in the presence of finely divided grain mash, separating the yeast from the resulting beer and returning the beer to the primary fermentation.

8. A method of producing yeast and alcohol which comprises subjecting a saccharine material to alcoholic fermentation with yeast, separating the yeast from the resulting beer, subjecting the yeast to refermentation in a saccharine wort substantially more dilute than the primary fermentation in the presence of a substantial amount of grain substance, separating the yeast from the resulting beer and returning the beer to the primary fermentation.

9. A method of producing yeast and alcohol which comprises subjecting a saccharine material to alcoholic fermentation with yeast, separating the yeast from the resulting beer, subjecting the yeast to refermentation in a saccharine wort of a density of about 3 to 8° Brix in the presence of a substantial amount of grain substance, separating the yeast from the resulting beer and returning the beer to the primary fermentation.

10. A method of producing yeast and alcohol which comprises subjecting a saccharine material to alcoholic fermentation with yeast, separating the yeast from the resulting beer, subjecting the yeast to anaerobic refermentation in a saccharine wort substantially more dilute than the primary fermentation in the presence of a substantial amount of grain substance, separating the yeast from the resulting beer and returning the beer to the primary fermentation.

11. A method of producing yeast and alcohol which comprises subjecting a saccharine material to alcoholic fermentation with yeast, separating the yeast from the resulting beer, and subjecting the yeast to refermentation in the presence of a substantial amount of grain substance and hops.

12. A method of producing yeast and alcohol which comprises subjecting a saccharine material to alcoholic fermentation with yeast, separating the yeast from the resulting beer, and subjecting the yeast to refermentation in the presence of grain mash, the solid particles of which are of the order of 1 to 3 microns in size.

GUSTAVE T. REICH.